J. H. LEHMAN.
SHUTTER FOR MOVING PICTURE MACHINES.
APPLICATION FILED JAN. 2, 1915.
1,349,214.
Patented Aug. 10, 1920.
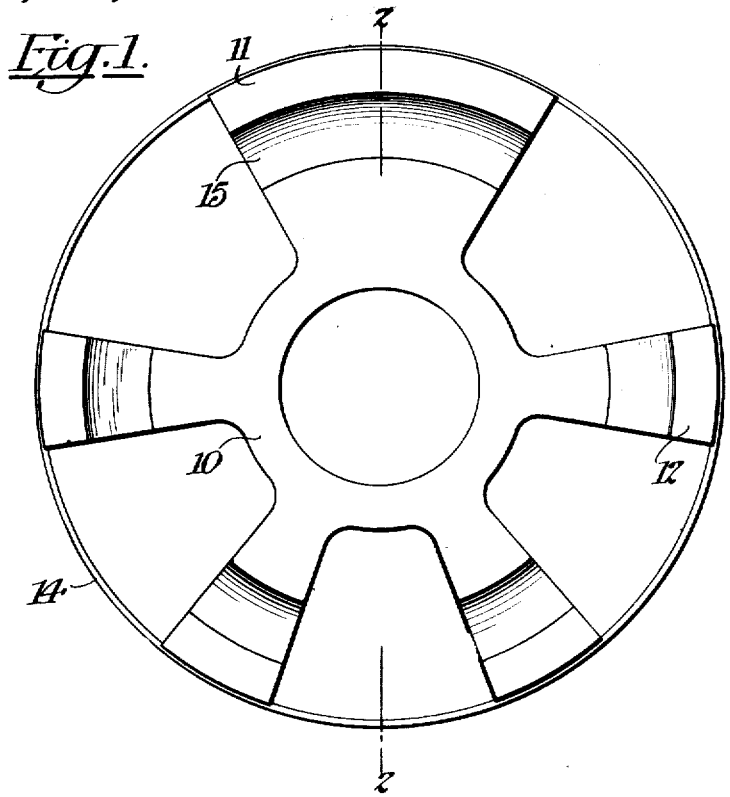
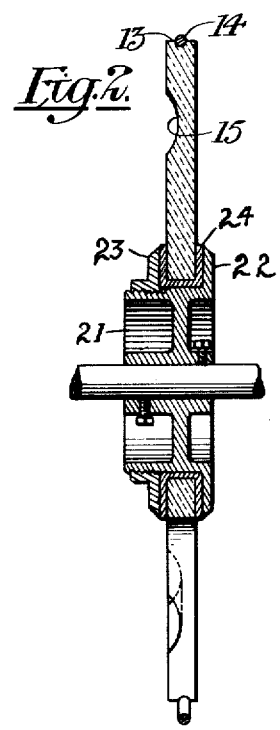
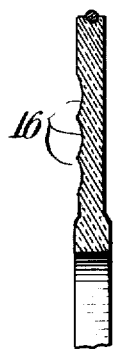
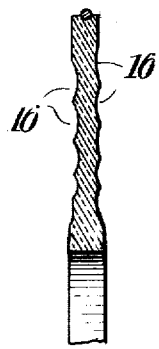
Inventor
Joseph H. Lehman
by his Attorney

UNITED STATES PATENT OFFICE.

JOSEPH H. LEHMAN, OF NEW YORK, N. Y.

SHUTTER FOR MOVING-PICTURE MACHINES.

1,349,214.  Specification of Letters Patent.  Patented Aug. 10, 1920.

Application filed January 2, 1915. Serial No. 33.

*To all whom it may concern:*

Be it known that I, JOSEPH H. LEHMAN, a citizen of the United States, and resident of New York, borough of Manhattan, in the county of New York and State of New York, have invented certain new and useful Improvements in Shutters for Moving-Picture Machines, of which the following is a specification.

A common type of shutter now employed in moving picture projectors includes an opaque portion movable into and out of the line of the light rays. The picture is projected on the screen when the opaque portion is out of line, while the film is advanced while the light rays are shut off by the opaque portion. Such movable shutters have been made in various forms such as disks with radially extending sections spaced apart to leave the apertures or by perforating metal plates or as an oscillating opaque section movable back and forth in front of and past the light aperture. In such constructions, the light rays are entirely cut off by the passage of the opaque portion over the light aperture and therefore when the picture is being projected, the screen is alternately darkened and highly illuminated. This causes what is known as a "flicker" which is very trying on the eyes of the observer. In some constructions in order to reduce the "flicker," additional opaque portions have been provided which move across in front of the light aperture while the picture is being projected on the screen so as to break up or subdivide the period of exposure and render less conspicuous the time period during which the opaque portion is in position and the film is being advanced.

The object of my invention is to avoid this rapid and successive darkening and illuminating of the screen and to maintain the screen illuminated to a more nearly uniform extent all of the time. My shutter in its preferred form includes apertures or transparent portions and obscuring portions, which latter are not opaque. By forming the shutter of glass, the obscuring portions may be so designed that the light rays in passing through them will be broken up, deflected or distorted, but not stopped. Thus, the light rays may pass from the source of light to the screen at all times but the picture will not be projected on to the screen during the time the obscuring portion or portions of the shutter are in position.

In the preferred embodiment of my invention, I employ a disk having spaced obscuring portions of glass in which the free transmission of the light rays and the projecting of the picture is prevented by irregularity in the contour of the surface of the glass. This projecting of the picture may be prevented by a frosting or etching of the surface or by the forming of prisms, lenses, ridges, grooves or other such irregularities on the surface or by opaque particles in the glass. I may provide only a single obscuring portion which comes into position during the time when the film is being advanced or I may, and in fact preferably do, provide auxiliary obscuring portions which pass across the light aperture during the period while the picture is being projected on the screen. The obscuring portion being of a character which will permit all or substantially all of the light rays to pass therethrough but which breaks them up so as to destroy the picture, has the effect on the eye of the observer of making the change from one picture to another substantially or entirely imperceptible and the elimination of the darkening periods eliminates substantially all of the objectionable flicker which is now present.

Reference is to be had to the accompanying drawings forming a part of this specification and in which similar reference characters indicate corresponding parts in the several views. In the drawings, Figure 1 is a face view of a shutter constructed in accordance with my invention;

Fig. 2 is a transverse section on the line 2—2 of Fig. 1;

Figs. 3, 4, 5 and 6 are sections similar to Fig. 2 but showing a modified form of surface contour; and Fig. 7 is a face view of a portion of another modified form.

In the specific form illustrated in Fig. 1, I form the shutter of a single piece of glass having a hub portion 10 and a plurality of radially extending flanges, wings or shutter sections, one of which, 11, may serve as the main obscuring section while the remainder of the sections 12 may serve as auxiliary obscuration sections. To reinforce and strengthen the shutter, the hub may be made of increased thickness and the periphery may be bound with metal. As shown, the peripheral edge of each of the sections 11 and 12 has a groove 13 therein and a wire 14 encircles the shutter and lies within these grooves. The portion of each of the sections 11 and 12 which comes in front of the light aperture or which is in the line of the light rays passing to the screen, is so formed as to break up the light rays or to so deflect, distort, or scatter them as to prevent the formation of a picture while the obscuring section is in position.

In the form shown in Figs. 1 and 2, this may be accomplished by forming one surface of the glass concave, as for instance by means of a groove 15, the width of which is sufficient to cover the light aperture of the machine. The groove extends concentric with the axis of rotation of the shutter so that all parts of it will bear the same relationship to the eccentrically disposed light aperture of the machine. The forming of one surface concave converts this portion of the shutter into a lens, but the curvature must be such that the screen will not be in the focus of the lens and the lens will not act to throw a recognizable picture on the screen.

Instead of having one groove, it is evident that a plurality of narrower concave grooves 16 might be employed as shown in Fig. 3 and these may be on both surfaces as shown in Fig. 4 instead of on only one surface. One or more convex portions or ridges 17 might be employed as is shown in Fig. 5, or a single wider ridge 18 as shown in Fig. 6. The curvature of the grooves or ridges should also be such that no picture can be formed on the screen when the curved portion is in the path of the light rays. If desired, the grooves may have ridges made very much smaller than those shown. For instance, they may be produced by coating the glass with a composition of wax or other suitable material, marking grooves in the wax and etching the glass along these markings to produce the desired grooves and ridges. The composition of the etching fluid, such as hydrofluoric acid, may be such that the surface of the ridges will be left smooth and polished and these ridges may be made as small as one-hundredth of an inch in width.

Instead of having annular ridges or grooves, I may have a series of knobs, projections, or prisms 19 as shown in Fig. 7, the surface of each of which may be regular or irregular and either polished or roughened. Preferably the surface is such that it will cut down to the minimum extent the transmission of light rays. The better the transmission of the light rays, the less will be the contrast in the degree of illumination of the screen as an obscuration portion comes into and goes out of position.

The spaces between the obscuring portions are such as will permit the formation of the picture on the screen and the main obscuring portion 11 is of such width that the advancement of the film may be completed while this section is in the path of the light rays. The auxiliary sections may, in some instances, be omitted although I preferably employ one or more of them and permit them to pass while the picture is being exposed so as to render less conspicuous the obscuring action at the time of the film advancement. The successive sections need not necessarily all have the same form of surface irregularity, or light diffusing or refracting elements. If desired, the glass may be slightly tinted so as to give the screen any desired tint during the obscuration which may be found softening or soothing to the eye.

It will of course be evident that the portions of the shutter of lesser thickness will permit a freer transmission of the light rays than does the thicker portions with their deeper color.

The shutter may be secured to the shaft or other support in any suitable manner but preferably a clamping mechanism is employed which includes some form of gasket and it will reduce the liability of breaking the glass. In Fig. 2, I have shown a hub 21 having a rigid flange 22 and a detachable flange 23 for clamping the opposite surfaces of the glass and have shown a packing 24 which may be of lead, fiber or other similar composition, disposed between the glass and the clamping portions.

Although I have shown all of the sections and the hub as being molded or cut from a single piece of glass, it is of course evident that the various sections may be made of separate pieces of glass and rigidly secured together in any suitable manner, as for instance, in the hub shown in Fig. 2. The specific construction shown also has but one main obscuring portion and is designed to rotate one revolution for each film advancement, yet it is of course evident that a plurality of main sections might be employed and a correspondingly slower speed of rotation used.

Having thus described my invention, what I claim as new and desire to secure by Letters Patent is:

1. A shutter for moving picture projectors including a section of transparent material movable into and out of the path of the light rays, and having one surface thereof presenting a series of lenses extending in the direction of travel to refract or diffuse the light without cutting it off from the screen.

2. A shutter for moving picture projectors including a picture obscuring portion formed of transparent material one surface thereof having circumferentially extending grooves, the position, number and form of which being such as to refract the light rays to a sufficient degree to prevent the formation of a picture on the screen when said obscuring portion is in position, but at the same time to permit the passage of light through the obscuring portion to the screen to illuminate the latter.

3. A rotary shutter for moving picture projectors including a picture obstructing portion formed of a sheet of transparent material having upon one surface thereof a series of alternate grooves and ridges concentric with the axis of rotation of the shutter, the inclination of the sides of the ridges being such that the light rays passing through said portion to the screen are refracted to a sufficient degree to prevent the formation of a picture on the screen when the picture obscuring portion is in position.

4. A rotary shutter for moving picture projectors including a picture obstructing portion formed of a sheet of tinted or colored transparent material having upon one surface thereof a series of alternate grooves and ridges concentric with the axis of rotation of the shutter and forming lenses, the inclination of the sides of the ridges being such that the light rays passing through said portion to the screen are refracted to a sufficient degree to prevent the formation of a picture on the screen when the picture obscuring portion is in position.

5. A rotary shutter for moving picture machines, including an obscuration blade formed of transparent material and having the surface thereof presenting a series of ridges of comparatively low altitude in respect to their width and extending concentric to the axis of rotation, and serving as light refractors.

6. A shutter for moving picture machines, including an obscuration blade formed of transparent material of gradually varying thickness whereby one surface thereof presents a series of ridges of comparatively low altitude in respect to their width and serving as light refractors.

7. A rotary shutter for moving picture machines, including a series of annular concentric sections of different light transmitting characteristics.

8. A rotary shutter for moving picture machines, including a sector shaped obscuration portion formed of tinted transparent material divided into a series of concentric sections separated by annular grooves.

9. A rotary shutter for moving picture machines including a sector-shaped obscuration portion, formed of tinted transparent material, and having at one surface thereof means whereby successive portions of the effective area have different light transmitting characteristics and serving to maintain the area of illumination upon the screen substantially constant at all times.

10. A rotary shutter for moving picture machines including a sector-shaped obscuration portion, formed of tinted transparent material, spaced successive portions thereof being less translucent than the intermediate portions and serving to maintain the area of illumination upon the screen substantially constant at all times.

11. A rotary shutter for moving picture machines including an imperforated sector-shaped obscuration portion of tinted light transmitting material, the effective area thereof varying in light transmitting characteristics in different portions thereof and serving to maintain the area of illumination upon the screen substantially constant at all times.

12. In a motion picture machine, a shutter comprising a body of transparent material having means for diffusing or destroying the focus of the rays going to the screen while maintaining the area of illumination upon, and the amount of light going to, the screen substantially constant at all times.

13. A shutter for moving picture machines comprising a body of transparent material provided on its surface with integral light diffusing projections, whereby the focus of the rays is destroyed while the area of illumination upon, and the amount of light going to, the screen, is maintained substantially constant.

14. An apparatus of the class described comprising a transparent screen having cut away portions and intervening portions adapted to diffuse the light which passes therethrough, the surface of said intervening portions being interrupted by concentric ridges.

15. In the art of projecting motion pictures the step which consists in diffusing or destroying the focus of the illuminating rays passing from the projecting apparatus to the screen simultaneously with the change of pictures, while maintaining the area of illumination upon, and the amount of light going to the screen substantially constant at all times.

Signed at New York city, in the county of New York and State of New York this 30th day of December, A. D. 1914.

JOSEPH H. LEHMAN.

Witnesses:
C. W. FAIRBANK,
FLORENCE LEVIEN.